July 10, 1928.

O. VON EBERHARD

MILLING CUTTER

Filed July 20, 1926

Inventor
Otto von Eberhard
By Kingston Gray
Attys.

July 10, 1928.

O. VON EBERHARD

MILLING CUTTER

Filed July 20, 1926

Inventor
Otto von Eberhard

Patented July 10, 1928.

1,676,719

UNITED STATES PATENT OFFICE.

OTTO VON EBERHARD, OF ESSEN, GERMANY, ASSIGNOR TO FRIED. KRUPP AKTIENGE-SELLSCHAFT, OF ESSEN-ON-THE-RUHR, GERMANY.

MILLING CUTTER.

Application filed July 20, 1926, Serial No. 123,673, and in Germany January 30, 1926.

The invention relates to milling cutters of the kind described in my pending patent application dated November 9th, 1925, Serial Number 67,924, and has in particular reference to those milling cutters which are composed of individual disks and with which the conditions are so chosen that by altering the mutual arrangement of said disks the cutting teeth arranged along quick motion helical lines inclined to one side, as well as those arranged along helical lines inclined to the other side may be brought into common ranks or lines. The object of my present invention is a milling cutter of the above-stated kind, in which the alteration of the mutual arrangement of the disks is effected by turning them.

Two cylindrical worm hobs are illustrated as embodiments of my invention in the drawings which accompany and form part of this specification, these embodiments further offering the advantage that the individual coils of the worms have the same mutual spacing over the entire length of the hob after turning the said disks, as before, so that a regrinding of the flanks of the teeth is rendered possible in an easy manner even after the disks have been turned.

The embodiment illustrated in Figs. 1 to 3 will be described first.

The milling cutter is composed of six disks A to F which are mounted, in the manner described in my prior application, on a sleeve-shaped carrier (not shown), and are secured thereon against longitudinal and turning movement, this latter being prevented by a spline of the carrier engaging corresponding longitudinal grooves of the disks A to F. Disk A has but one groove, $a^1$, while the disks B to F have two grooves each, viz, $b^1$, $b^2$, $c^1$, $c^2$, $d^1$, $d^2$, $e^1$, $e^2$, $f^1$, $f^2$, respectively.

Figure 1:
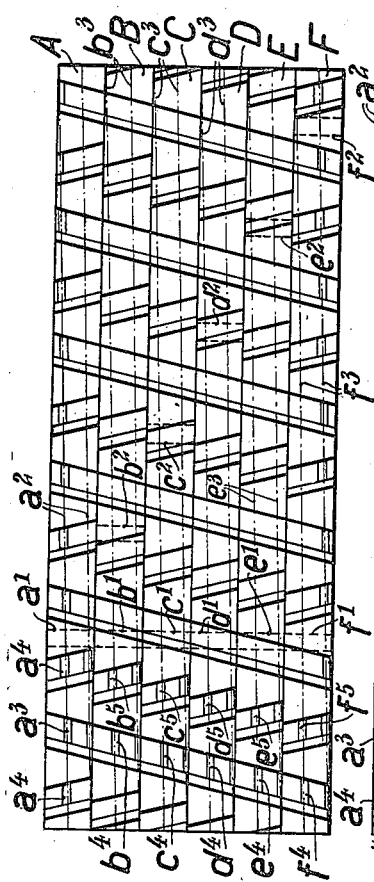
Fig. 1 shows the developed shell surface of the milling cutter forming the first embodiment.

In Fig. 1 the disks A to F take a mutual angular position in which the individual coils of the worm thread, denoted by the dot and dash straight lines $a^2$, $b^3$, $c^3$, $d^3$, $e^3$, $f^3$, everywhere have the same mutual distance even over the joint between two neighboring disks. The teeth of the milling cutter are arranged in longitudinal rows at equal angular distances and on quick motion helical lines and, in particular, the teeth $a^3$, $b^4$, $c^4$, $d^4$, $e^4$, $f^4$, which extend along helical lines inclined to the right, are located in common ranks, while the teeth $a^4$, $b^5$, $c^5$, $d^5$, $e^5$, $f^5$ follow each other in zig-zag lines. Furthermore, with the described mutual arrangement of the disks A to F the spline of the carrier engages the grooves $a^1$, $b^1$, $c^1$, $d^1$, $e^1$, $f^1$ of the disks. With the disks in this position the teeth $a^3$, $b^4$, $c^4$, $d^4$, $e^4$, $f^4$ can be ground without difficulty at their front faces as well as at their backed-off flanges.

Figure 2:
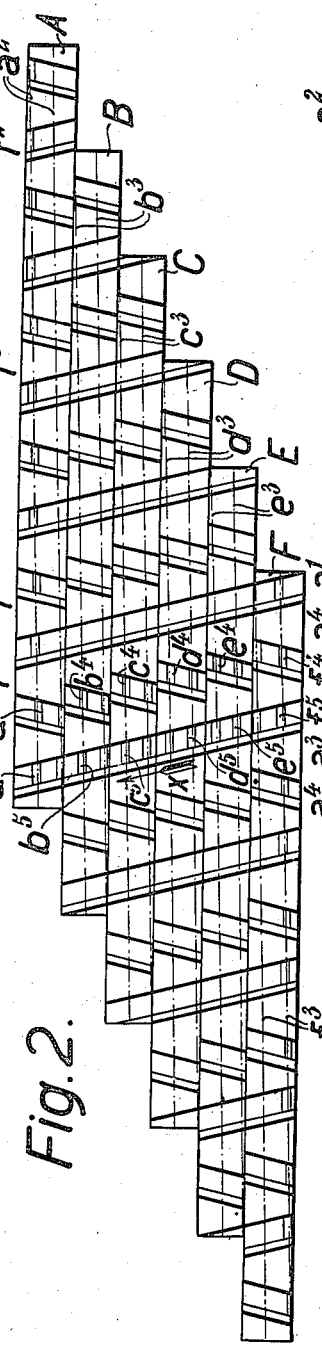
Figs. 2 and 3 show each a development of the same milling cutter with the individual disks in altered angular positions.
Figure 3:
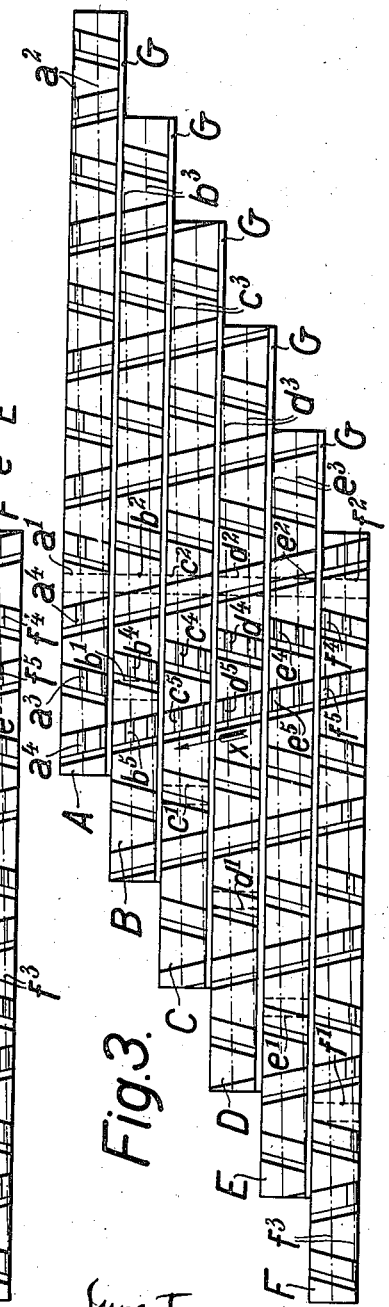

As shown in Fig. 2, by an alteration of the mutual angular position of the disks A to F, that is by turning them, it is easily attained that now the teeth $a^4$, $b^5$, $c^5$, $d^5$, $e^5$, $f^5$ come to be located in common ranks, this offering the possibility of easily grinding the front faces of these teeth. This turning of the disks, however, causes the distance between two neighboring worm coils (for instance $a^2$ and $b^3$) of neighboring disks, to change, as can be seen from Fig. 2, and in this case the individual coils would no longer be equally spaced over the entire length of the cutter, this rendering much more difficult the grinding of the teeth flanks. Fig. 3 shows the manner in which this drawback may be obviated.

In the position of the disks illustrated in Fig. 2 they have been turned in a direction such as to cause the distance between neighboring coils of neighboring disks to have diminished. Now, when the disks are shifted from the position of Fig. 2 in the oblique longitudinal direction indicated by arrow $x$, that is, the direction along which the front faces of a row of teeth inclined to the left lie, to such an extent that the spacing of the coils located near the joints between two neighboring disks is again uniform, as in the position of Fig. 1, then the arrangement illustrated in Fig. 3 will be attained. Of course, the front faces of the teeth $a^4$, $b^5$ ... $f^5$ continue to lie in their common rank, upon said longitudinal displacement taking place. The correct mutual distance of the disks A to F, when in position of Fig. 3, is secured by suitable rings G interposed between them. Of course, in reality the described displacement of the disks A to F does not consist, as in the development, in a parallel shifting motion in the direction of arrow $x$, but in a corresponding helical motion. The arrangement of the grooves $b^2, c^2, d^2, e^2, f^2$ is such as to cause them to be located in a common plane with the groove $a^1$, with the mutual angular position of the disks shown in Fig. 3, which position differs by a certain amount from that of Fig. 2, due to said oblique shifting motion in the direction of arrow $x$. The disks may thus be fastened on the carrier in this angular position and with distances determined by the interposed rings G. In this position also the teeth $a^4, b^5 \ldots f^5$, located along the helical lines inclined to the left are adapted to be ground on their front faces as well as on the flanks, since not only the front faces lie in common ranks, but also the flanks follow each other at equal distances over the whole length of the cutter. For the milling work the disks A to F are brought again into their position of Fig. 1.

Figure 4:
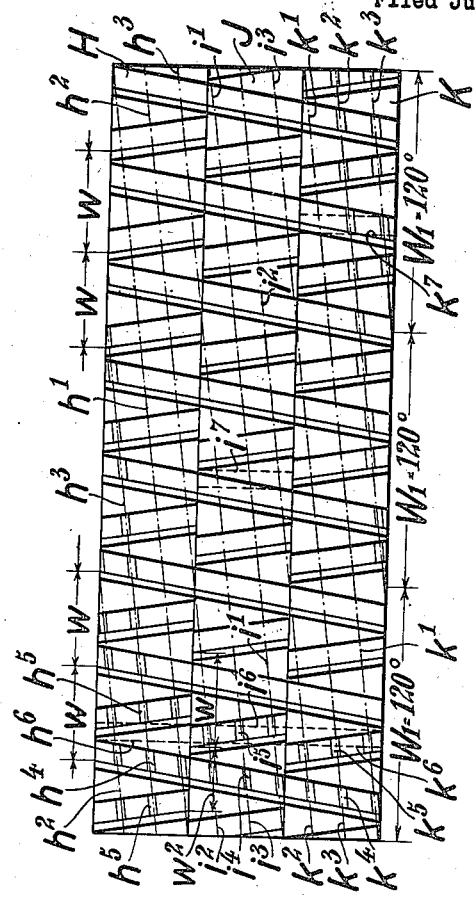
Fig. 4 shows the second embodiment in a view corresponding to Fig. 1.
Figure 5:
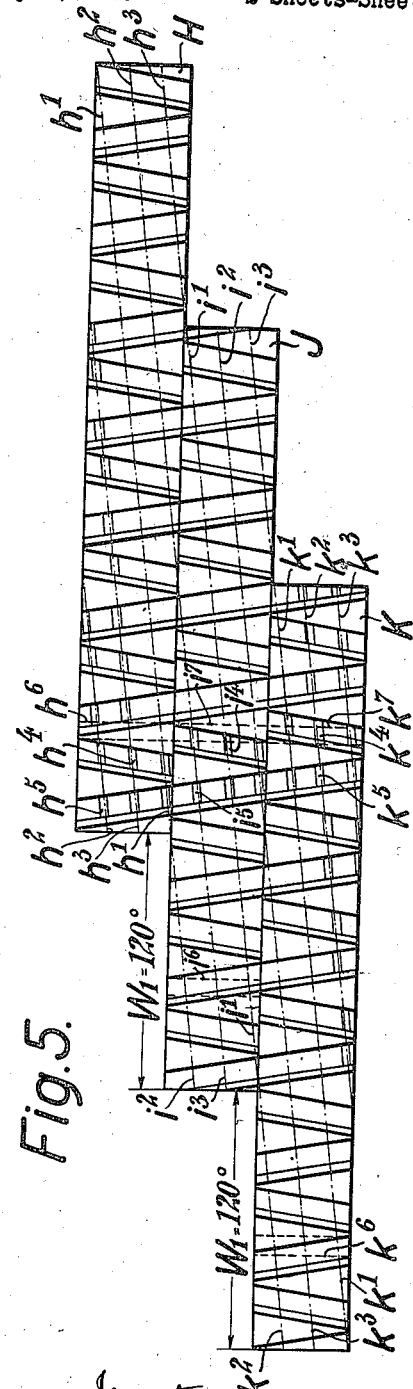
Fig. 5 shows the same in a view corresponding to Fig. 3.

Figs. 4 and 5 demonstrate that under certain circumstances the intermediate rings G may be dispensed with, namely, when the worm hob has multiple helical thread. The hob shown in these figures is assumed to be composed of three disks H, J, K and has triple thread, the pitch of which is equal to the thickness of the disks. The individual coils of said three threads of disk H are denoted by $h^1, h^2, h^3$, of disk J by $i^1, i^2, i^3$, of disk K by $k^1, k^2, k^3$. In Fig. 4 the disks H, J, K are shown in a mutual angular position, in which the teeth $h^4, i^4$ and $k^4$, located on the helical lines inclined to the right lie in common ranks, while the teeth inclined to the left, $h^5, i^5$ and $k^5$ follow each other in zig-zag lines, the teeth being arranged in eight longitudinal rows along quick motion helical lines and at equal angular distances $w$. Of the coils of the worm thread located on two neighboring disks the coils $h^2$ and $i^2$, $h^3$ and $i^3$, $i^2$ and $k^2$ and $i^3$ and $k^3$ lie in a common rank. If, now, the mutual angular position of the disks is thought to be altered, in the manner shown in Fig. 5, by the angular distance $W_1 = 120°$ between two neighboring disks, then the coils $h^1$ and $i^2$, $h^2$ and $i^3$, $h^3$ and $i^1$, $i^1$ and $k^2$, $i^2$ and $k^3$ and $i^3$ and $k^1$, which previously were located at different ranks, come to lie in common ranks, so that the individual coils have equal spacing again over the entire length of the worm hob, without it being necessary, as in the first embodiment, to interpose rings G. By suitably adapting the conditions it may easily be attained that by turning the disks an angle $W_1$ the teeth $h^5, i^5, k^5$, located on the helical lines inclined to the left, come into common ranks. Referring to Fig. 4, if $w_2$ represents the angular distance between two rows of teeth inclined to the left ($h^5 i^5$) on adjacent disks, and on opposite sides of a row of teeth inclined to the right ($h^4, i^4, k^4$), the distance being measured on the plane separating the two disks, then the disks, in order to bring the teeth inclined to the left into a common rank, have to be turned an angle $w_2 + kw$, $k$ being 0 or any integral number. In the present case, as the worm hob has eight rows of teeth of each inclination, $w$ is $= \frac{1}{8} \cdot 360° = 45°$. $w_2$ has been chosen to be $= \frac{2}{3} w = 30°$. If, further, $k$ is taken $= 2$, the required turning angle becomes $$w_2 + kw = 30° + 2.45° = 120°.$$

As this angle is $= W_1$, it results that when the disks are turned according to the angular distance ($W_1$) of the individual helical threads, the teeth $h^5, i^5, k^5$ at the same time come to lie in a common rank, as Fig. 5 shows.

In order to secure the disks in their different mutual angular positions a longitudinal groove $h^6$ is provided in disk H, two grooves $i^6, i^7$ in disk J and two grooves $k^6, k^7$ in disk K, these grooves corresponding to the grooves $a^1, b^1, c^1 \ldots f^1$ of the first embodiment.

Instead of turning the disks the angle $W_1 = 120°$, they may of course be turned double this angle $2W_1 = 240°$, as, in this case too all the coils located on different disks of the worm thread come to lie in common ranks. By suitably selecting the special conditions it may easily be attained, in this case too that, upon turning the disks $2W_1 = 240°$, the teeth previously extending in a zig-zag line come into common ranks. The essential point merely consist in that the turning angle is in a proportion of an integral number to the angular distance ($W_1$) of neighboring helical threads. The same object may be attained with any other multiple thread instead of triple thread by suitable selection of measurements in accordance with the principles set forth in connection with the illustrative embodiment described.

In the foregoing specification I explained my invention, for the sake of simplicity, as adapted to a milling cutter of cylindrical shape, in which the developed surfaces are of rectangular shape. The given explanations, however, include mutatis mutandis such as milling cutters of conical shape, the developments of which have the shape of annular sectors. With conical milling cutters my invention is of a particular importance, because the alterations of the arrangement of the individual disks of conical cutters can be effected only by turning them, whilst with cylindrical cutters this alteration may be effected, besides, in the manner described in my prior application by altering the order of the disks in the longitudinal direction.

Claims—

1. A milling cutter comprising a plurality of disks, two series of teeth on said disks, one series being arranged along quick motion helical lines inclined to the right, the other series being arranged along quick motion helical lines inclined to the left, the lines of one series being broken at the joints between two disks to form zig-zag rows of teeth when the teeth of the other series are arranged in common ranks along all the disks, and means for holding the disks in two different angular positions relative to each other, in one of which the teeth of one series are arranged in common ranks, and in the other of which the teeth of the other series are arranged in common ranks.

2. A milling cutter according to claim 1 in which the teeth of both series are arranged along screw thread lines, the threads being equally spaced along the whole length of the cutter when the disks are in one relative position, and means for holding the disks a definite distance apart in the other relative position thereof, the distance being such as to maintain the spacing of the threads uniform in the second mentioned relative position.

3. In a milling cutter according to claim 1 in which the teeth of both series are arranged along screw thread lines, the threads being equally spaced along the whole length of the cutter when the disks are in one relative position, and a washer for each two neighboring disks, said washer being adapted to be inserted between the disks to hold them a definite distance apart in the other relative position thereof, said distance being such as to maintain the spacing of the threads uniform in the second mentioned relative position.

4. A milling cutter according to claim 1 in which the teeth of both series are arranged along multiple screw thread lines, the angular distance between the two relative positions of the disks being in the proportion of an integral number to the angular distance between neighboring screw threads measured in a plane perpendicular to the axis of the cutter.

The foregoing specification signed at Cologne, Germany, this 1st day of July, 1926.

OTTO v. EBERHARD.